US011178651B2

(12) United States Patent
Balasubramanian et al.

(10) Patent No.: US 11,178,651 B2
(45) Date of Patent: Nov. 16, 2021

(54) ACTIVE INTERFERENCE MANAGEMENT

(71) Applicant: InterDigital Patent Holdings, Inc., Wilmington, DE (US)

(72) Inventors: Anantharaman Balasubramanian, San Diego, CA (US); Ravikumar V. Pragada, Warrington, PA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 16/495,950

(22) PCT Filed: Mar. 23, 2018

(86) PCT No.: PCT/US2018/023997
§ 371 (c)(1),
(2) Date: Sep. 20, 2019

(87) PCT Pub. No.: WO2018/175870
PCT Pub. Date: Sep. 27, 2018

(65) Prior Publication Data
US 2020/0145963 A1 May 7, 2020

Related U.S. Application Data

(60) Provisional application No. 62/475,651, filed on Mar. 23, 2017.

(51) Int. Cl.
*H04W 72/04* (2009.01)
*H04L 5/00* (2006.01)
(Continued)

(52) U.S. Cl.
CPC ........ *H04W 72/042* (2013.01); *G08G 5/0069* (2013.01); *H04L 5/0007* (2013.01);
(Continued)

(58) Field of Classification Search
CPC ............ G08G 5/0069; H04W 72/042; H04W 72/082; H04L 5/0007; H04L 5/0037; H04L 5/0048; H04L 5/0053; H04L 5/0062
See application file for complete search history.

(56) References Cited

U.S. PATENT DOCUMENTS

2013/0121168 A1   5/2013   Luo et al.
2013/0252626 A1   9/2013   Lee et al.
(Continued)

FOREIGN PATENT DOCUMENTS

WO    2015/044408 A1    4/2015

OTHER PUBLICATIONS

"Leading the World to 5G: Evolving Cellular Technologies for Safer Drone Operation", Qualcomm Report, Sep. 2016, 31 pages.
(Continued)

*Primary Examiner* — Paul H Masur
(74) *Attorney, Agent, or Firm* — Condo Roccia Koptiw LLP

(57) ABSTRACT

Systems, methods, and instrumentalities are disclosed for active interference management. Active interference management may be provided for designated data regions and/or superzones. UAV-specific or other designated data regions (e.g., with data zones) may enable dynamic inter-cell interference management and high reliability command & control for UAVs in interference prone in environments. Data zone/region specific control channel search space may support inter-cell interference cancellation. Aggregation N levels (e.g., during EPDCCH encoding) may be dependent on an interference level of a zone. Data zone specific reference signals (DS-RS) may enable UAVs connected to neighboring cells to estimate an interference channel per zone. Interference management may be provided during semi- (Continued)

persistent scheduling (SPS) transmissions. Reliability of Physical Downlink Control Channel (PDCCH) may be enhanced (EPDCCH), e.g., with interference assistance signaling. Uplink interference management may operate with dedicated data region/zones. A downlink control information (DCI) format may be provided for UAVs.

20 Claims, 16 Drawing Sheets

(51) Int. Cl.
*H04W 72/08* (2009.01)
*G08G 5/00* (2006.01)
(52) U.S. Cl.
CPC .......... *H04L 5/0037* (2013.01); *H04L 5/0048* (2013.01); *H04L 5/0053* (2013.01); *H04L 5/0062* (2013.01); *H04W 72/082* (2013.01)

(56) References Cited

U.S. PATENT DOCUMENTS

| | | | |
|---|---|---|---|
| 2015/0029958 A1* | 1/2015 | Park | H04J 11/0053 370/329 |
| 2015/0172035 A1* | 6/2015 | Xu | H04W 72/082 370/329 |
| 2016/0080963 A1* | 3/2016 | Marinier | H04W 24/08 370/252 |
| 2016/0309282 A1 | 10/2016 | Xu et al. | |
| 2018/0139648 A1* | 5/2018 | Park | H04W 72/082 |
| 2019/0215214 A1* | 7/2019 | Kim | H04W 16/28 |

OTHER PUBLICATIONS

Erik Dahlman et al.,, "4G: LTE/LTE-Advanced for Mobile Broadband", Second Edition, Elsevier Publications, Waltham, MA:, 2014, 509 pages.

A. Ghosh, et al., "Fundamentals of LTE'", Pearson Education, Inc., Upper Saddle River, NJ: Prentice Hall, 2011,455 pages.

3rd Generation Partnership Project (3GPP), R1-1611513, "sPDCCH Search Space Design", Ericsson, 3GPP TSG-RAN WG1 #87, Reno, USA, Nov. 14-18, 2016, pp. 1-5.

3rd Generation Partnership Project (3GPP), R2-1701077, "Potential Challenges on Emerging Drone Services", NTT DoCoMo, Inc., 3GPP TSG-RAN WG2 #97, Athens, Greece, Feb. 13-17, 2017, pp. 1-4.

3rd Generation Partnership Project (3GPP), RP-170156, "New SID on Enhanced LTE Support for Aerial Vehicles", NTT DoCoMo Inc., Ericsson, 3GPP TSG RAN Meeting #75, Dubrovnik, Croatia, Mar. 6-9, 2017, 5 pages.

3rd Generation Partnership Project (3GPP), TS 36.213 V14.0.0, "Technical Specification Group Radio Access Network; Evolved Universal Terrestrial Radio Access (E-UTRA); Physical layer procedures (Release 14)", Sep. 2016, pp. 1-406.

3rd Generation Partnership Project (3GPP), TR 38.900 V14.2.0, "Technical Specification Group Radio Access Network, Study on Channel Model for Frequency Spectrum Above 6 GHz (Release 14)", Dec. 2016, pp. 1-84.

3rd Generation Partnership Project (3GPP), TS 36.211 V14.1.0, "Technical Specification Group Radio Access Network; Evolved Universal Terrestrial Radio Access (E-UTRA); Physical channels and modulation (Release 14)", Dec. 2016, pp. 1-175.

3rd Generation Partnership Project (3GPP), TS 36.212 V14.1.1, "Technical Specification Group Radio Access Network, Evolved Universal Terrestrial Radio Access (E-UTRA), Multiplexing and Channel Coding (Release 14)", Jan. 2017, pp. 1-149.

3rd Generation Partnership Project (3GPP), TR 36.866 V12.0.1, "Technical Specification Group Radio Access Network; Study on Network-Assisted Interference Cancellation and Suppression (NAIC) for LTE (Release 12)", Mar. 2014, pp. 1-64.

3rd Generation Partnership Project (3GPP), R1-1703586, "Introduction of Uplink Capacity Enhancements for LTE to 36.213 Sections 00-05", Motorola Mobility, 3GPP TSG-RAN WG1 Meeting #88, Athens, Greece, Feb. 13-17, 2017, 43 pages.

* cited by examiner

ACTIVE INTERFERENCE MANAGEMENT

CROSS-REFERENCE TO RELATED APPLICATIONS

This application is the National Stage entry under 35 U.S.C. § 371 of Patent Cooperation Treaty Application PCT/US2018/023997, filed Mar. 23, 2018, which claims priority from U.S. Provisional Patent Application No. 62/475,651, filed Mar. 23, 2017, which is incorporated by reference herein in its entirety.

BACKGROUND

Mobile communications continue to evolve. A fifth generation may be referred to as 5G, A previous (legacy) generation of mobile communication may be, for example, fourth generation (4G) long term evolution (LTE). Mobile wireless communications implement a variety of radio access technologies (RATS), such as New Radio (NR) or 5G flexible RAT. Use cases for NR may include, for example, extreme Mobile Broadband (eMBB), Ultra High Reliability and Low Latency Communications (URLLC) and massive Machine Type Communications (mMTC).

SUMMARY

Systems, methods, and instrumentalities are disclosed for active interference management. Active interference management may be provided for designated data regions and/or superzones. UAV-specific or other designated data regions (e.g., with data zones) may enable dynamic inter-cell interference management and high reliability command & control for UAVs in interference prone environments. Data zone/region specific control channel search space may support inter-cell interference cancellation. Aggregation levels (e.g., during EPDCCH encoding) may be dependent on an interference level of a zone. Data zone specific reference signals (DS-RS) may enable UAVs connected to neighboring cells to estimate an interference channel per zone. Interference management may be provided during semi-persistent scheduling (SPS) transmissions. Reliability of Physical Downlink Control Channel (PDCCH) may be enhanced (EPDCCH), e.g., with interference assistance signaling. Uplink interference management may operate with dedicated data region/zones. A downlink control information (DCI) format may be provided for UAVs.

A WTRU may receive and decode a PDCCH transmission from a serving cell. The PDCCH transmission may include DCI, which may be used by the WTRU to determine a data region assigned to the WTRU by the serving cell. The WTRU may receive and decode one or more EPDCCH transmission from one or more neighboring cells. The EPDCCH transmissions may include interference information associated with the one or more neighboring cells. The WTRU may use the interference information to receive one or more data transmission from the serving cell.

A PDCCH of a serving cell and an EPDCCH of one or more neighboring cells may be decoded by a WTRU using blind decoding. The EPDCCH of the one or more neighboring cells may be decoded using zone specific radio network temporary identifier (ZN-RNTI). The ZN-RNTI and/or the search space may be associated with a data region assigned to a WTRU by the serving cell.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
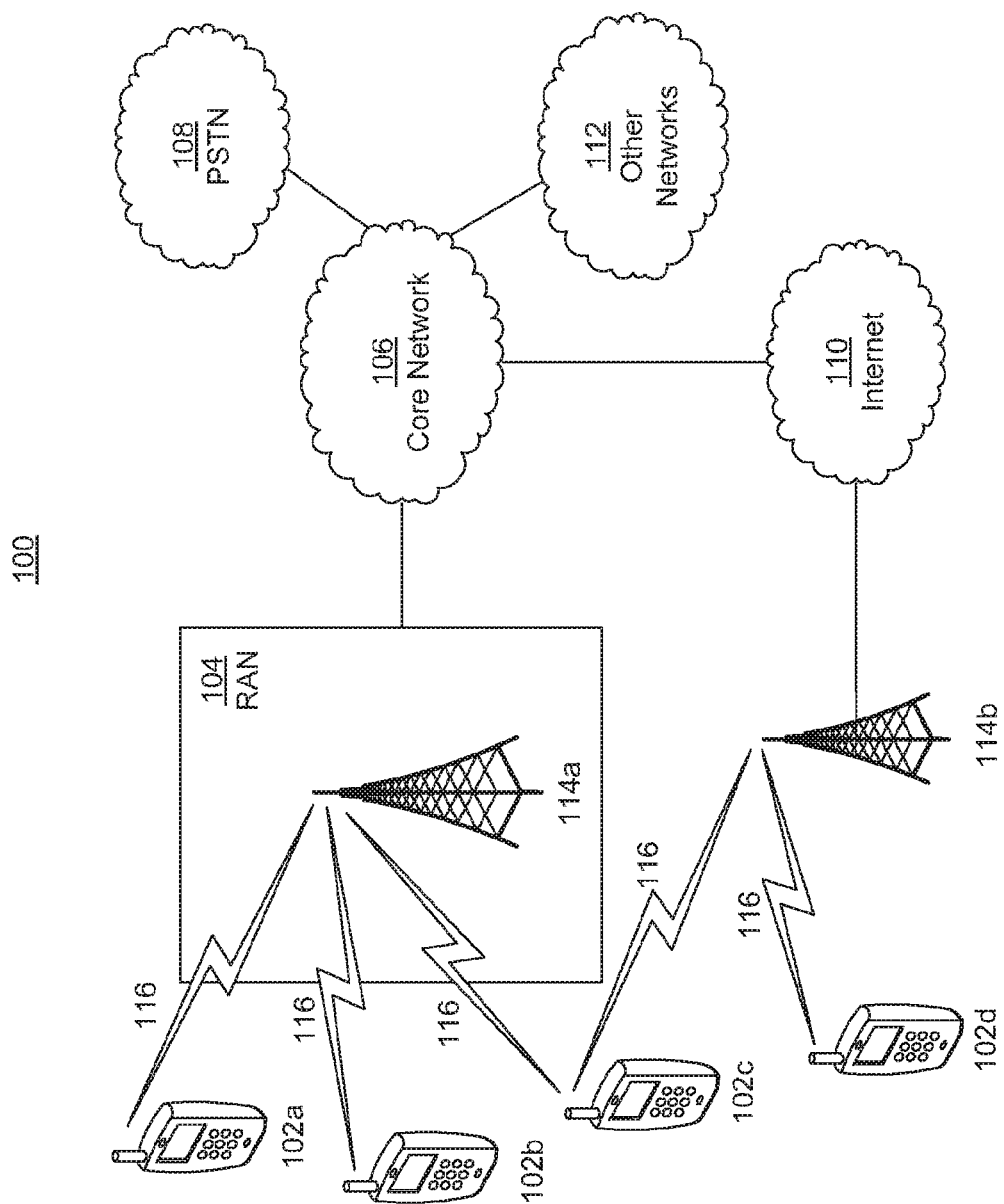
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114 a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over interact protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP interact protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
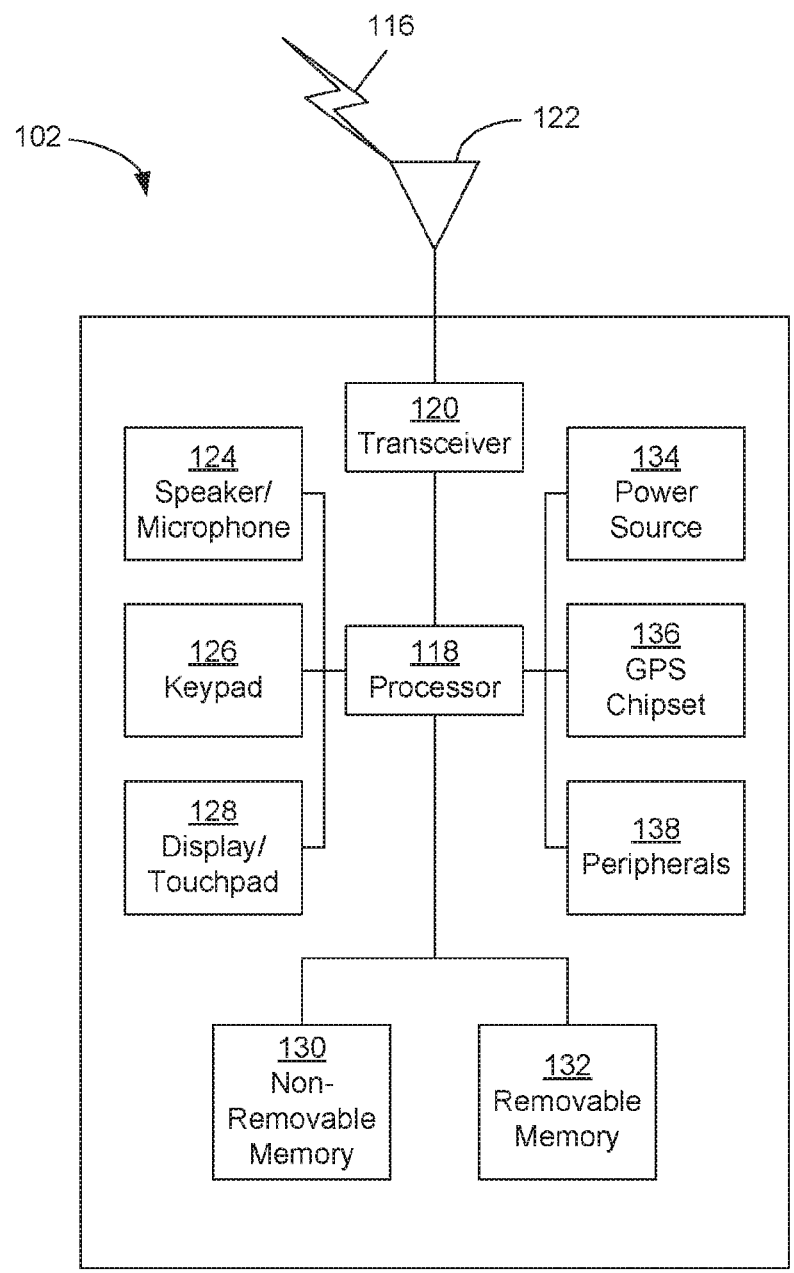
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NAM), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
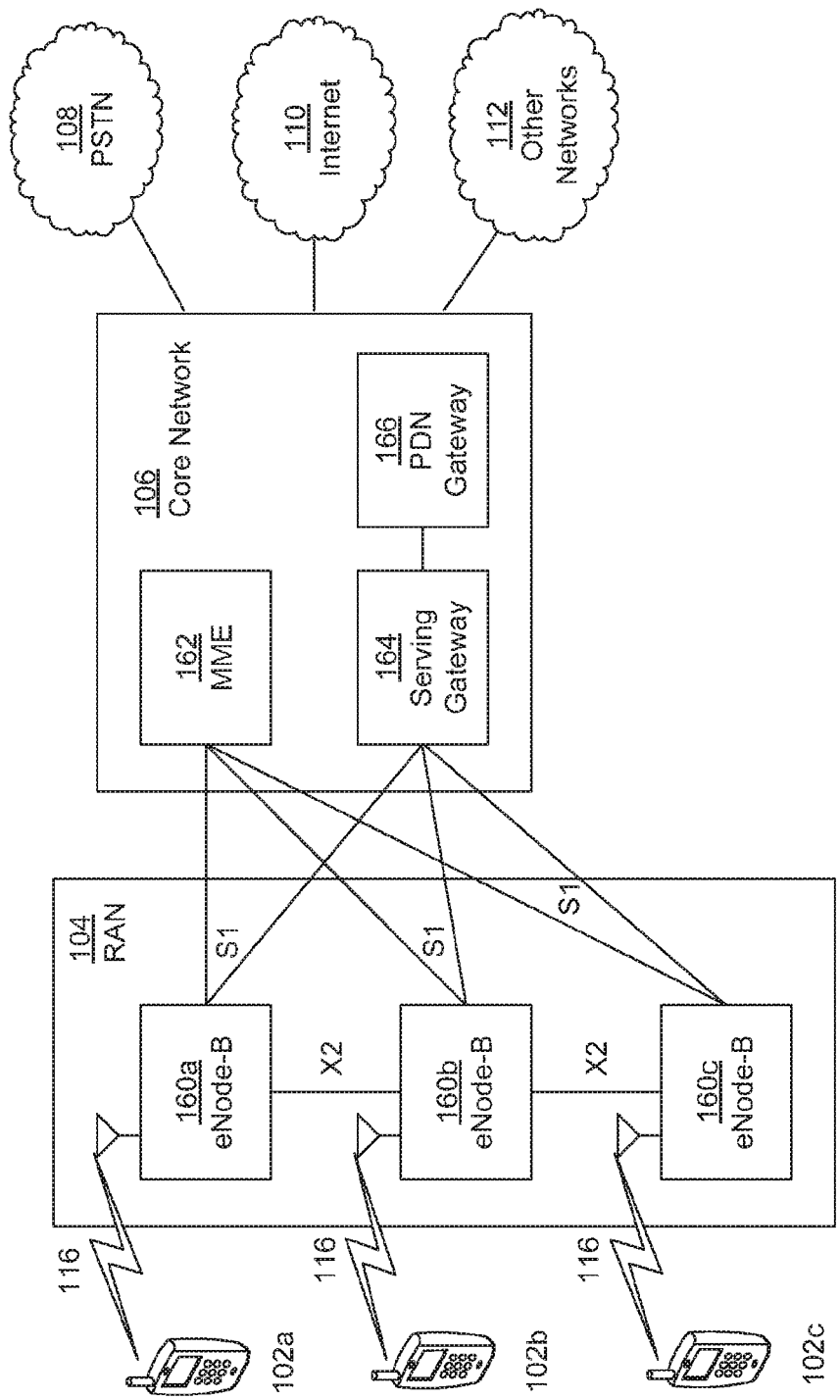
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MEMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide, the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative, embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between e.g., directly between) the source and destination STAs with a direct link setup (DLS). In certain representative embodiments, the DLS may use an 802.11e DLS or an 802.11z tunneled DLS (TDLS). A WLAN using an independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac, 802.11af supports 5 MHz, 10 MHz and 20 MHz bandwidths in the TV White Space (TVWS) spectrum, and 802.11ab supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
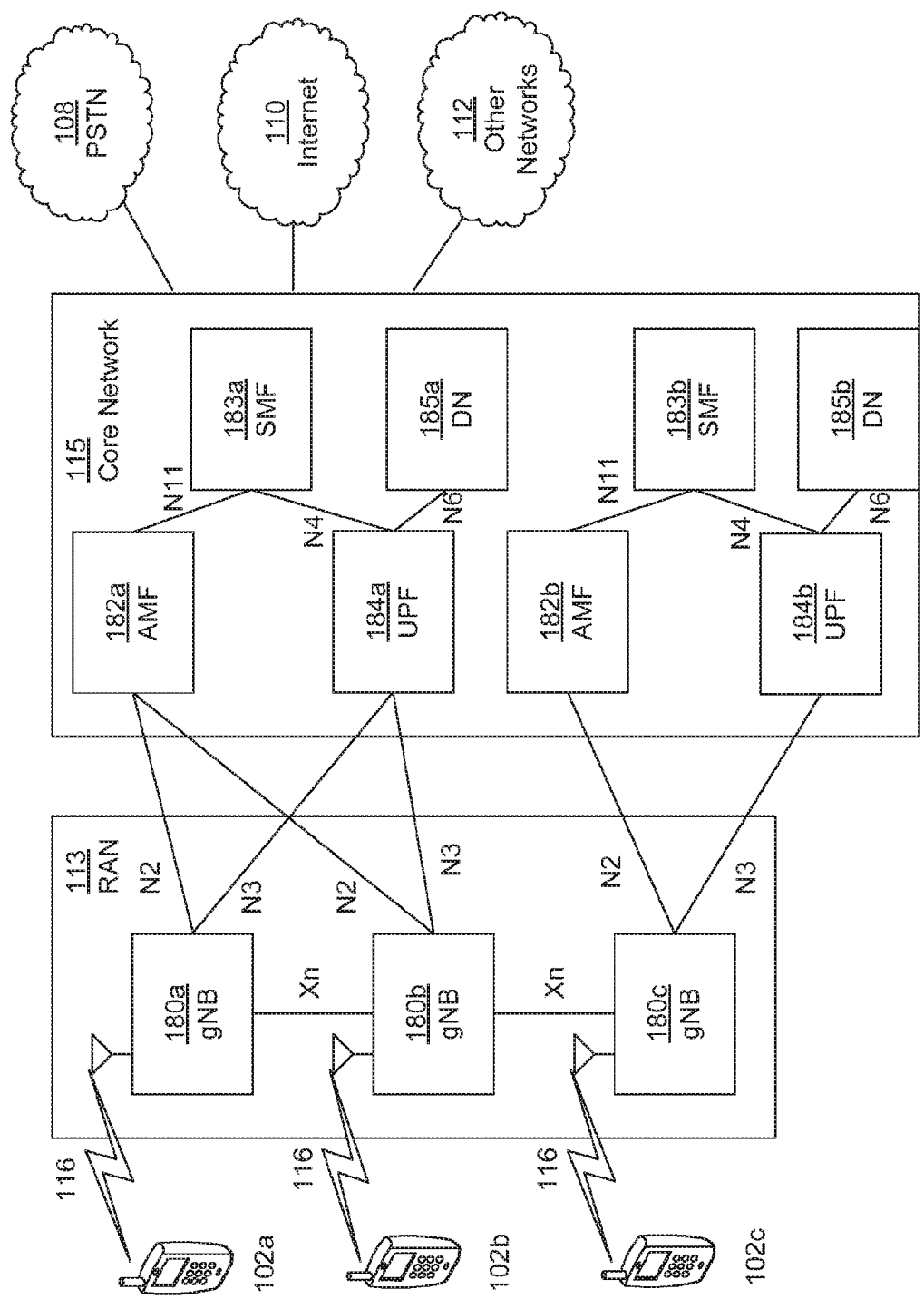
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MEM technology. For example, gNBs 180a, 108b tray utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. in the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDL session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed. PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of WTRU 102a-d, Base Station 114a-b, eNode-B 160a-c, MME 162, SGW 164, PGW 166, gNB 180a-c, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Cellular communications may be provided for drones. Cellular infrastructure may provide coverage to drones (e.g., at various altitudes and interference levels) in addition to terrestrial WTRUs. Techniques described herein may be applicable to drones/unmanned aerial vehicles (UAVS) communicating in a cellular communication system. However, although the techniques described may be presented in terms of example communications utilized by UAVs, the techniques may also be more generally applicable to any or other types of WTRUs. The terms UE, WTRU, UAV, drone, UAV WTRU, user, etc. may be used interchangeably herein. Drone communication may be integrated to coexist with the cellular terrestrial users terrestrial WTRUs) of existing communication systems.

Differences in the operational scenarios between drones and terrestrial users may include expected usage and operation at altitudes between 0 and 400 feet for drones and expected usage and operation at altitudes between 0 and 50 feet for terrestrial users (e.g., on average). A communication system architecture designed predominantly for terrestrial users may be adapted to drones. Traditional channel models have been developed for terrestrial systems and communication protocols have been designed based on terrestrial channel models. One or modifications of terrestrial communication systems may be modified to support UAVs in addition to terrestrial users.

A channel environment at an altitude of 400-feet may be different from a channel environment for a terrestrial user on the ground. For example, channel environment at high altitudes (e.g., higher than 150 feet) may experience a strong line of sight (LOS) component while the channel environment at lower altitudes (e.g. less than 50 feet) may experience multi-path characteristics, e.g., similar to a terrestrial WTRU experience. Mid-range altitudes (e.g., between 50 and 150 feet) may have LOS and multi-path characteristics. Channels may be modeled at different altitudes for terrestrial communication system adaptation.

Table 1 illustrates the number of base stations that may be detected by a drone. As seen in Table 1, drones may detect more base stations as their altitude increases.

TABLE 1

| Altitude | Frequency Bands | | | | Neighbor Distance (miles) | | |
|---|---|---|---|---|---|---|---|
| | 700 MHz | 1700/ 2100 MHz | 1900 MHz | Total per Band | 700 MHz | 1700/ 2100 MHz | 1900 MHz |
| 400 feet | 7 | 5 | 6 | 18 | 11.5 | 1.6 | 3.16 |
| 300 feet | 4 | 7 | 5 | 16 | 7.1 | 5 | 1.66 |
| 200 feet | 6 | 5 | 7 | 18 | 11.5 | 1.6 | 1.66 |
| 100 feet | 7 | 4 | 6 | 17 | 9.9 | 1.6 | 1 |
| Ground | 4 | 4 | 2 | 10 | 1.6 | 1.6 | 1 |

Figure 2:
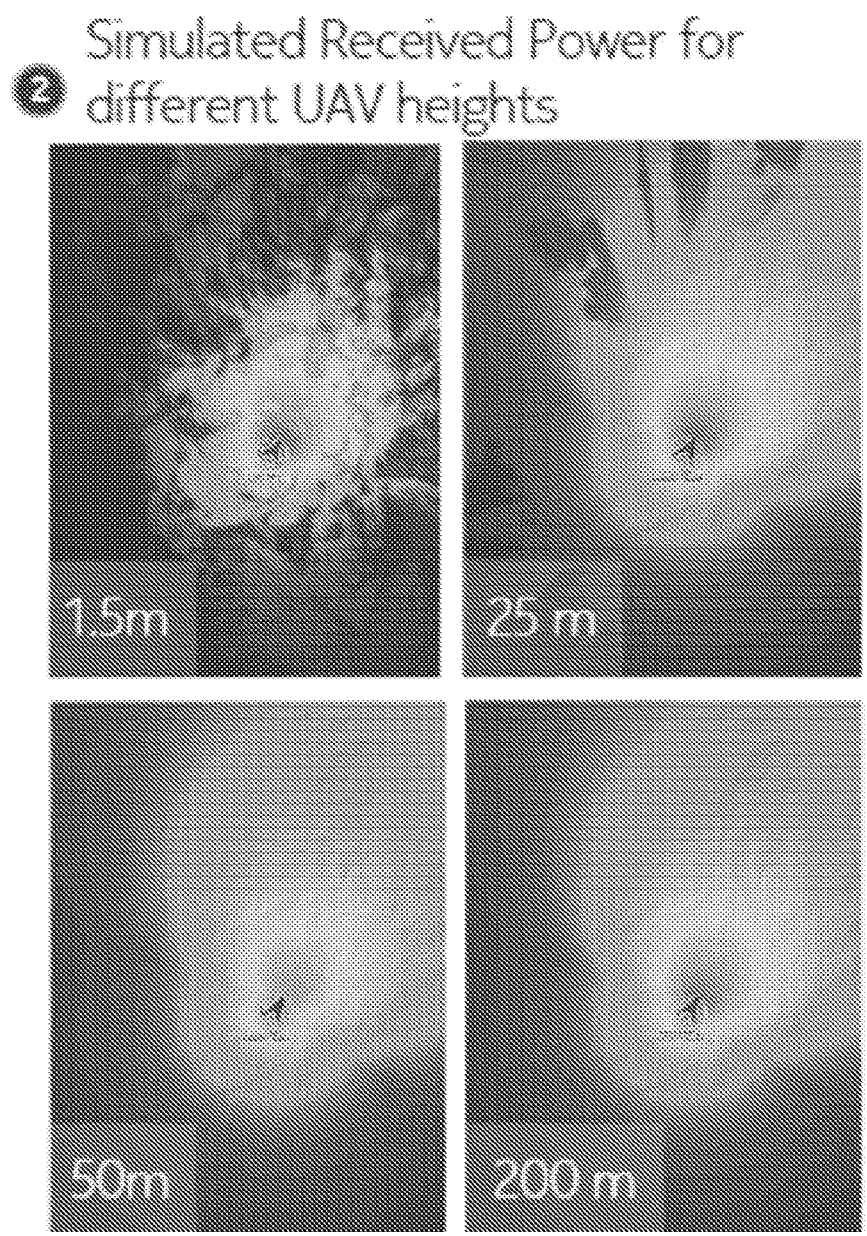
FIG. 2 is an example of simulation results for a single-cell scenario for different UAV altitudes.

FIG. 2 is an example of simulation results for a single-cell scenario for different UAV altitudes. As can be seen in FIG. 2, the coverage of the cell (e.g., measured power level) may increase as the altitude of the measurement is increased. Thus, as altitude increases, a given cell may be detected from farther away.

Figure 3:
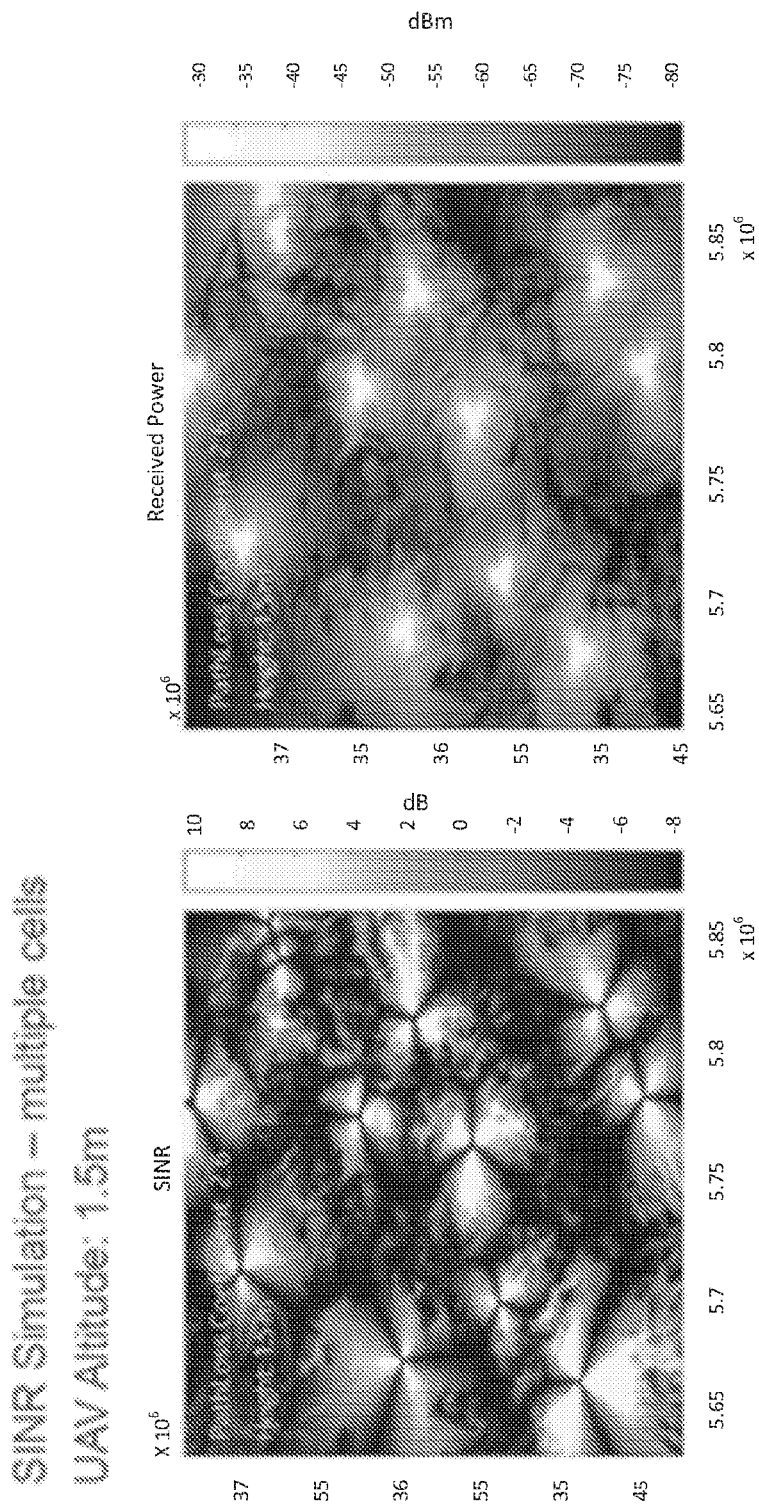
FIG. 3 is an example of simulation results for a multi-cell scenario based on a UAV altitude of 1.5 m.

FIG. 3 is an example of simulation results for a multi-cell scenario based on a UAV altitude of 1.5 m.

Figure 4:
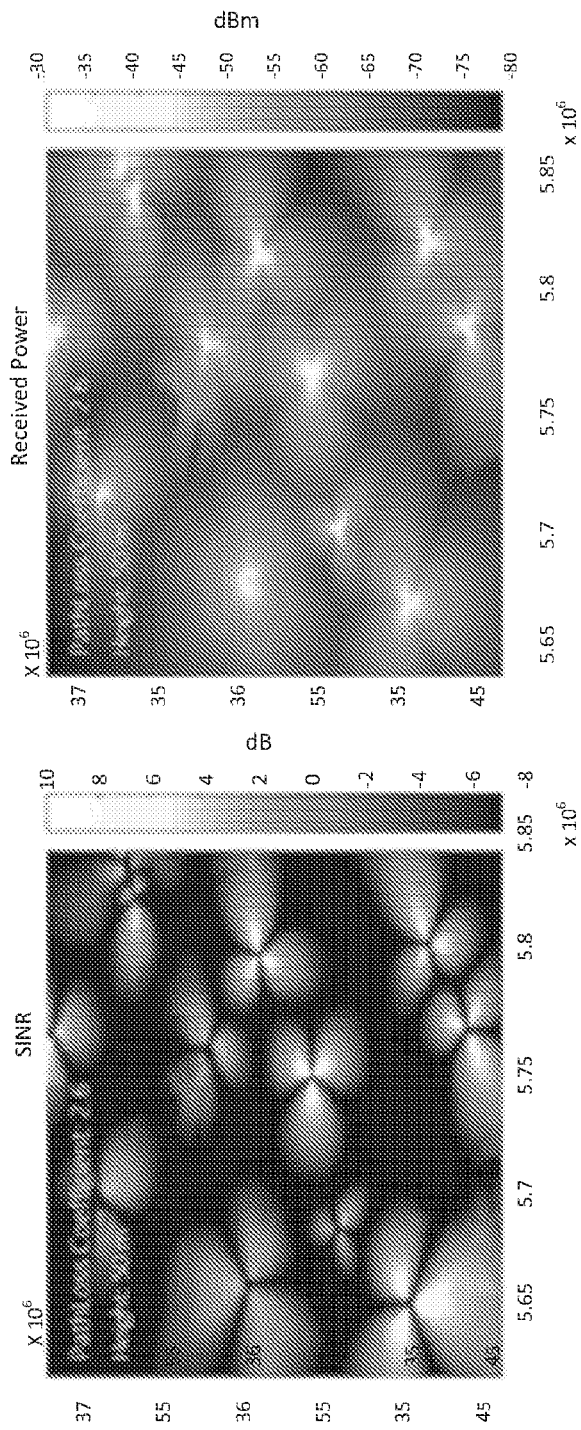
FIG. 4 is an example of simulation results for a multi-cell scenario based on a UAV altitude of 50 m.

FIG. 4 is an example of simulation results for a multi-cell scenario based on a UAV altitude of 50 m.

FIGS. 2-4 show the Signal to Interference and Noise Ratio (SINR) and the received power for different UAV altitudes for single-cell and multiple-cell scenarios. A drone may observe interference in a downlink and/or may generate interference in an uplink. Higher interference levels may be detrimental to reliable command and control (C2) operation for drones, which may affect market adoption. A communication system may provide highly reliable C2 operation for drones and coexistence with terrestrial WTRUs.

A communication system, that provides for the coexistence of terrestrial WTRU's and drones, may experience interference, particularly inter-cell interference at higher altitudes when the cells are designed primarily to serve terrestrial WTRUs. Interference may limit drone communications, for example, due to the line of sight propagation environment drones may experiences and the impact drones may have on terrestrial WTRUs. Interference may be managed in 3GPP networks, e.g., using interference suppression and interference cancellation. Interference suppression may be implemented, for example, by applying linear filtering on a received signal. Interference cancellation may be implemented, for example, by explicitly cancelling interference. Desired information and interference information may be jointly detected. Partial information about an interferer (e.g., modulation and coding scheme (MCS) and or an interferers' channel) may be known. In an example of interference cancellation, an RNTI of an interferer may be available. Codeword cancellation may be performed, e.g., to improve performance.

Spectrum may be allocated for aerial WTRUs (e.g., unmanned aerial vehicles (UAVs), aerial WTRUs or drones may be used interchangeably herein) in C and L bands, e.g., C-band: 5030-5091 MHz and L-band: 960-1164 MHz. Cellular operators may be provided part(s) of the C and L-bands where drones may be assigned dedicated resources. Reliable drone communications may be enabled in a cellular system framework, for example, by assigning dedicated resources (e.g., slices) to drones, which may meet FAA requirements for command & control.

Figure 5:
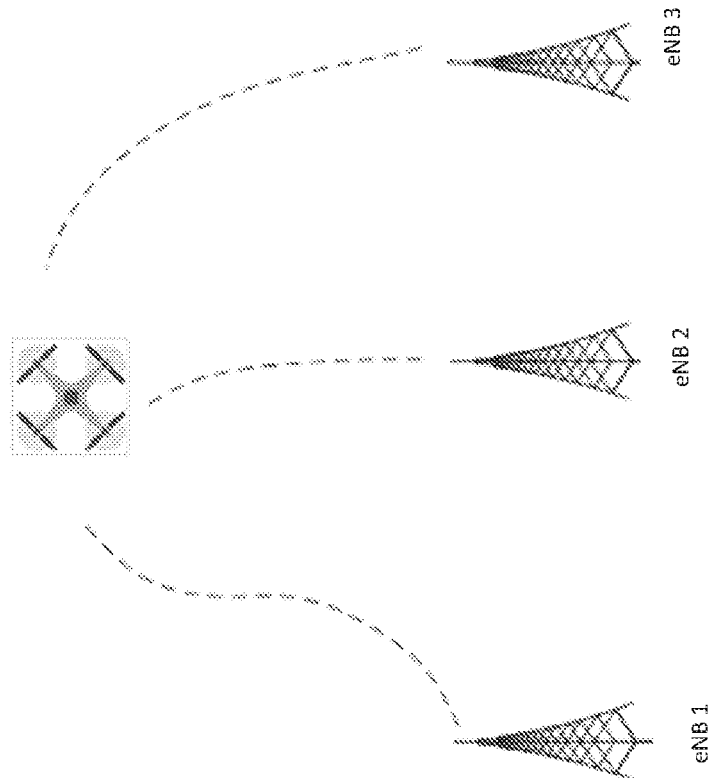
FIG. 5 is an example of a drone under coverage of multiple eNBs.

FIG. 5 is an example of a drone under the coverage of multiple eNBs. In an example, of a cellular wireless system, a drone may be under coverage of multiple cells/eNBs (e.g., eNB-1/cell-1, eNB-2/cell-2, eNB-3/cell-3, etc.). An eNB (e.g., eNB-2) may be associated with one or more serving cells. A drone may experience downlink interference from its neighboring cells (e.g., eNB-1, eNB-3). The number of neighboring cells and the strength of interference from neighboring cells that a drone may experience, may be higher (e.g., much higher) than a terrestrial WTRU. A drone (e.g., unlike terrestrial WTRUs) may have line of sight propagation channels with neighboring cells due to a higher operational environment altitude. The high inter-cell interference that may be experienced by a drone may reduce its reliability, which may be extremely detrimental for command & control operations.

A WTRU may be configured to perform one or more actions to implement dynamic inter-cell interference management. For example, the WTRU may be configured to send and/or receive data in one or more data regions in an LTE-Pro framework that are specifically reserved for UAVs (and/or for a particular application such as command and control signaling). A data region-specific control channel search space (e.g., a UAV data region specific control channel search space) may be defined, for example, to decode interference information from neighboring cells. An interference decoding process may comprise, for example, a control channel decoding (e.g., Physical Downlink Control Channel (PDCCH), enhanced PDCCH (ePDCCH), etc.) of a serving cell to infer a data region assignment, and an inter-cell control channel decoding (e.g., Physical Downlink Control Channel (PDCCH), enhanced PDCCH (ePDCCH), etc.) to enable interference cancellation.

A WTRU may use the interference information to enable dynamic inter-cell interference management. The WTRU may be configured to implement interference cancellation in order to cancel LOS interference signals while ensuring efficient resource management (e.g., as compared to interference avoidance such as Enhanced Inter-Cell Interference Coordination (eICIC) which may limit scheduler flexibility and/or resource usage). Interference management may be performed by WTRUs using, for example, interference information provided by cooperating eNBs/cells. The interference information may be specific to one or more designated data regions.

Figure 6:
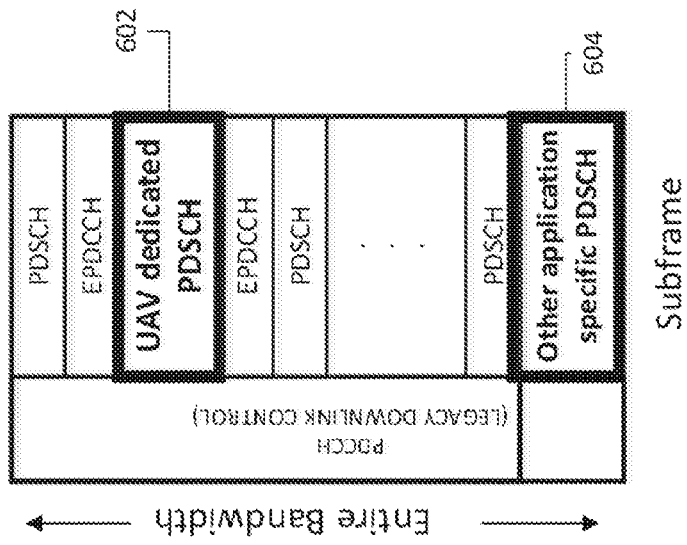
FIG. 6 is an example of a designated data region in physical downlink shared channel (PDSCH) in an LTE subframe.

FIG. 6 is an example of a designated data region in a PDSCH in an LTE subframe. FIG. 6 shows an example of providing designated data regions to enable unique requirements. For example, designated data regions (e.g., in an LTE-Pro framework) may enable dynamic inter-cell interference management for UAVs. This UAV framework may enable high reliability for command & control for a UAV in interference prone environments. As seen in FIG. 6, a data region 602 may be dedicated for UAV data or command & control transmissions. A UAV may be scheduled for data in data region 602. Another data region 604 may be used for other data transmission. For example, terrestrial WTRU's may be scheduled for data in data region 604.

Figure 7:
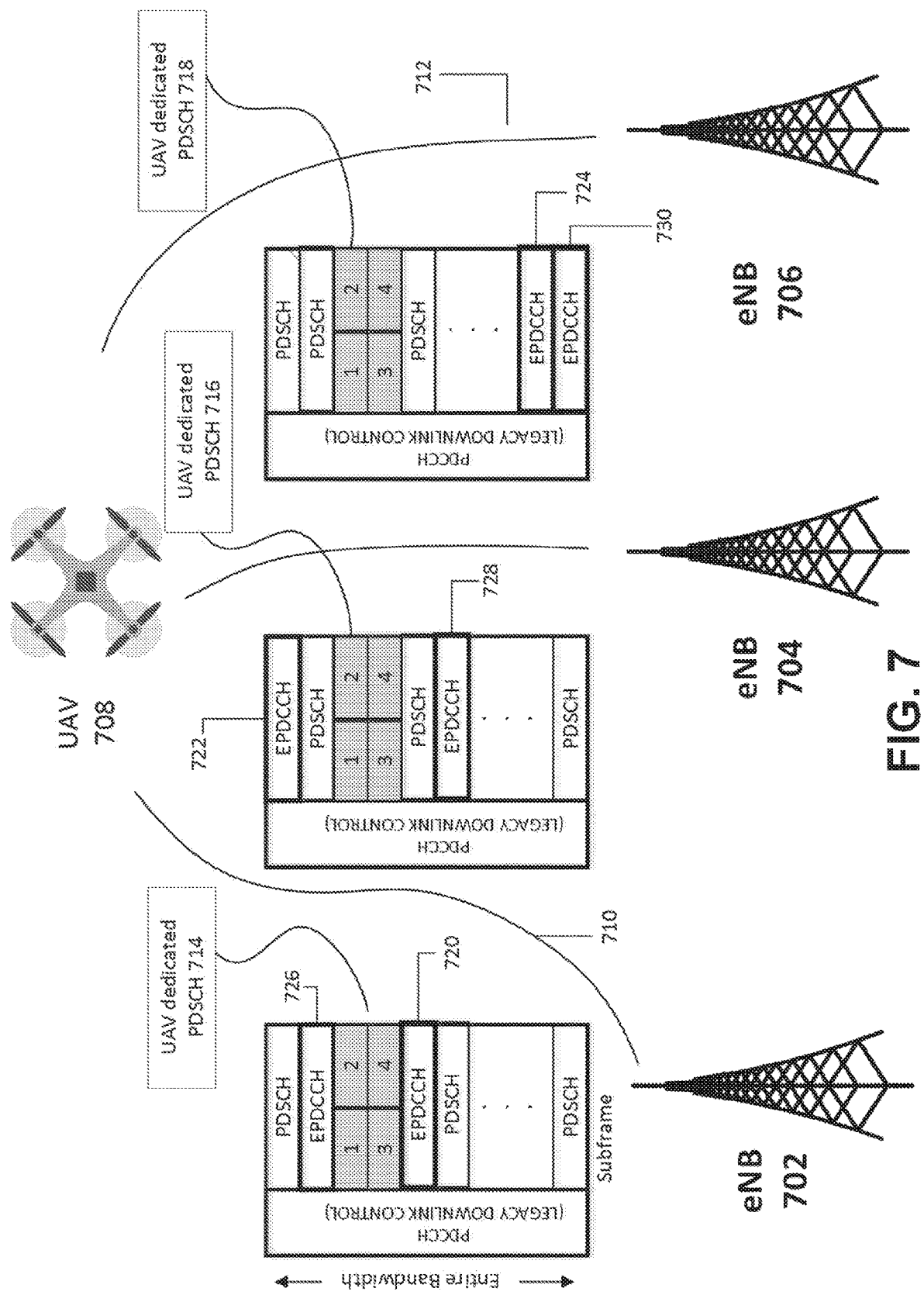
FIG. 7 is an example system view of dynamic interference management for UAV specific data regions.

FIG. 7 is an example system view of dynamic interference management for UAV specific data regions. In an example (e.g., as shown in FIG. 7), eNB 702, eNB 704, and eNB 706 may transmit during a given subframe. A UAV 708 may be in coverage of multiple eNBs (e.g., eNB 702, eNB 704, and eNB 706) and/or multiple cells (e.g., some cells may be transmitted from the same transmission point such as the same eNB). In the example shown in FIG. 7, the WTRU may be currently connected to a serving cell provided by eNB 704. The UAV may experience interference (e.g., interference 710 and 712) from neighboring cells provided by eNB 702 and eNB 706. Although not shown in FIG. 7, the UAV 708 may also suffer from interference from another, non-serving cell transmitted by eNB 704 and/or from multiple neighbor cells from each of eNB 702 and/or eNB 706.

A UAV may be scheduled for data transmission n a data region and/or a data zone. A data region (e.g., a UAV dedicated PDSCH 714, 716, and 718) may include, for example, multiple data zones (e.g., zones 1, 2, 3, and 4 in data regions 714, 716, 718). In an example, there may be four UAV designated PDSCH data zones numbered 1, 2, 3 and 4. Designated data regions and data zones may be pre-configured and may be uniform across cooperating eNBs (e.g., neighboring eNBs that may participate in data region/zone specific interference management). As seen in FIG. 7, cooperating eNBs may be eNB 702, eNB 704, and eNB 706. The cooperating eNBs may indicate interference information (e.g., interference information from a cell provided by the cooperating eNBs) for the date region and/or the date zone. Zones may (e.g., also) be distributed over PDSCH in a sub-frame. Zones may or may not be contiguous (e.g., as shown in FIG. 7). A (e.g., each) zone may comprise a variable number of Physical Resource Blocks (PRBs). Zones may vary in size, and a plurality of zones may or may not be the same size. A network may schedule UAVs in one or more (e.g., any or all) UAV designated regions and/or zones. As seen in FIG. 7 a UAV 708 may be scheduled in data region 716 (e.g., when the serving eNB is eNB 704) or data zone 1 of the data region 716. For example, the scheduling information may be sent in a PDCCH and/or EPDCCH transmission. An eNB may service terrestrial WTRUs in zones designated for UAVs (e.g., zones unused by UAVs). UAVs may be scheduled on data zones outside designated zones. A (e.g., each) data zone may be allocated to multiple UAVs. A (e.g., each) UAV may be scheduled across multiple zones in the same Transmission Time Interval (TTI).

Dynamic interference cancellation may be provided, for example, for UAV designated regions such as data zones 1-4 shown in FIG. 7.

A data zone/region specific control channel search space may be defined, for example, to enable inter-cell interference cancellation. An EPDCCH may have a data region specific search space defined per cell. A WTRU may use the region specific search space to determine e.g., decode) interference information from neighboring cells. The WTRU may use the interference information from neighboring cells to perform interference cancelation. A data region specific search space may be frequency division multiplexed across cells, for example, to avoid interference on the EPDCCH. Regions 720, 722, and 724 in FIG. 7 may denote an EPDCCH data region specific search space. A data region specific search space may be, for example, localized within a physical resource block (PRB) pair (e.g., as shown by example in FIG. 7), or distributed across several PRB pairs (e.g., as shown by example in FIG. 8).

Figure 8:
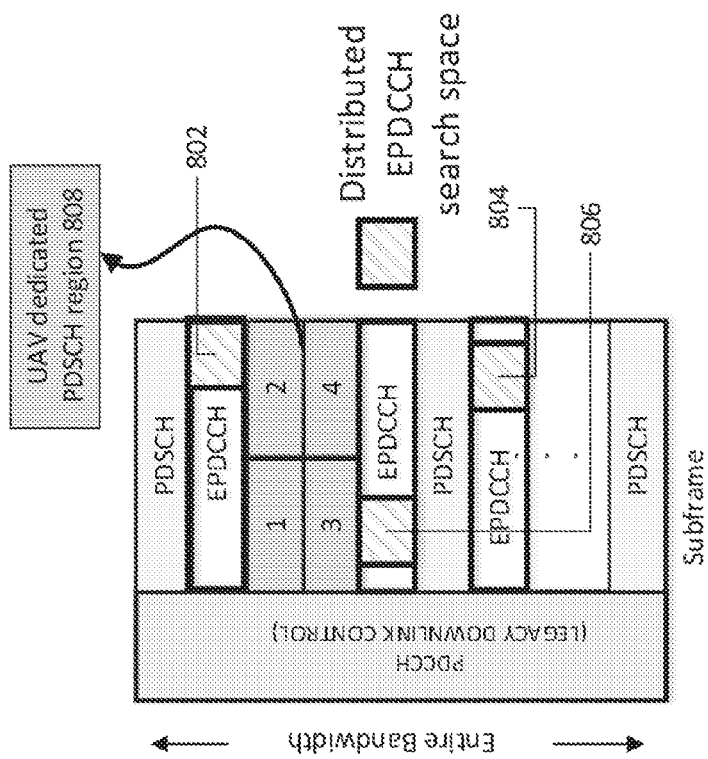
FIG. 8 is an example of a distributed data region specific Enhanced Physical Downlink Control Channel (EPDCCH) search space.

FIG. 8 is an example of data region specific EPDCCH search space distributed across several PRB pairs. As seen in FIG. 8, search spaces (e.g., search space regions 802, 804, and 806, which may be part of a distributed search space) may be distributed across PRB pairs. A WTRU may use the search spaces to determine interference information from a neighboring cell. The WTRU may use the interference information to perform interference cancelation.

In order to determine interference information for a given data region or data zone, a WTRU may be configured to utilize an interference decoding procedure whereby the interference information for a given cell/eNB within a given data region and/or zone may be provided in a control channel transmission from that given cell/eNB. Thus, a WTRU may decode data zone specific interference information from cooperating cells in order to cancel the interference from a data transmission that is sent in that data zone.

A UAV may infer data zones, which may be used to determine interference from neighboring cells. A UAV may determine a data region and/or zone where its scheduled data (e.g., data scheduled by an eNB) lies. For example, as seen in FIG. 7, a UAV 708 may determine its data is scheduled in region 716, or more specifically, in a particular zone (e.g., zone 3) in the region 716. A UAV may decode a PDCCH of a serving eNB to determine the data zone that is used for a data transmission. A UAV may perform a blind decoding of the PDCCH, A UAV may infer a resource block assignment, for example, upon successful PDCCH decoding. A UAV may (e.g., based on its resource block assignment) determine which one or more corresponding data zones the data is being transmitted in. The UAV may decode the corresponding data zone (e.g., the data zone which the UAV previously determined is being used for data transmission) of a neighboring cell to determine the interference caused by neighboring cells in the data zone.

A UAV may decode data zone specific interference information from cooperating neighbor cells. In an example, a UAV may perform blind decoding of a data zone specific EPDCCH to determine interference information from neighboring cells. A UAV may use, for example, a zone and/or region radio network temporary identifier (e.g., ZN-RNTI) and the (e.g. all the) aggregation levels that may be defined for the data zone and/or region (e.g., obtained by data zone inference) to decode a data zone and/or region specific EPDCCH of neighboring cells. As an example, the UAV may determine from a PDCCH in a serving cell that a PDSCH transmission is to be delivered to the UAV in data zone 2. Data zone 2 may be associated with a zone specific RNTI (ZN-RNTI) and/or zone-specific search space. The UAV may attempt to decode one or more EPDCCH transmission in one or more neighbor cells using the ZN-RNTI in the zone specific search space. Upon successfully decoding an EPDCCH using the ZN-RNTI in the zone specific search space of a neighbor cell, the WTRU may determine interference information for the neighbor cell, which may be comprised in the EPDCCH transmission. The WTRU may use this interference information to attempt to cancel the interference caused by the neighbor cell from the PDSCH transmission sent in the data zone from the serving cell. The process may be repeated for multiple neighbor cells.

Interference information for a (e.g., each) zone may be encoded, for example, by cooperating eNBs. A (e.g., every) cooperating eNB may encode interference information of (e.g., all) zones in its EPDCCH (e.g., for use by UAVs connected to neighboring cells). An eNB may (e.g., also) encode its own PDSCH information in a PDCCH.

A data zone specific control channel search may be provided. An RNTI may be defined per data zone (ZN-RNTI) and/or per region. A cyclic redundancy check (CRC) of the EPDCCH payload bits may be scrambled with the ZN-RNTI. In an example (e.g., as shown in FIGS. 7 and 8), there may be four defined ZN-RNTIs, e.g., one for each of zone-1, zone-2, zone-3 and zone-4. Interference information for a zone may be contained in the EPDCCH payload bits for that zone. Zone RNTI's (e.g., for every zone) may be common to the (e.g., all the) cooperating cells that may participate in UAV interference management. In some example, the RNTI may be common across the zones (e.g., may be region specific instead). For example, the indication of which zone the interference information is applicable to may be indicated in the Do and/or the ZN-RNTI may be common across each of the zones in the region.

Figure 9:
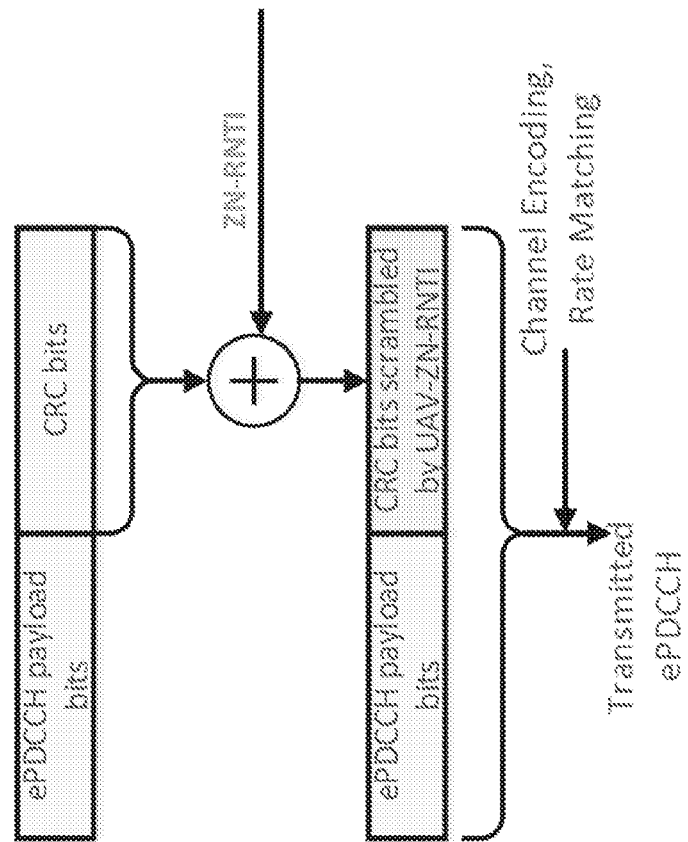
FIG. 9 is an example of encoding zone specific interference information in an EPDCCH.

FIG. 9 is an example of encoding zone specific interference information in an EPDCCH. In an example of interference encoding, a 16-bit CRC may be attached to EPDCCH payload bits. The EPDCCH payload bits may carry the interference information of a data zone and/or data region. CRC bits may be scrambled, for example, using a zone or region RNTI (e.g., ZN-RNTI). EPDCCH payload bits and scrambled CRC bits may be channel encoded (e.g., at rate ⅓), rate matched (e.g., similar to PDCCH) and transmitted. This procedure may be repeated for each zone, for example, by using the appropriate zone RNTIs.

An eNB may use radio resource control (RRC) signaling for decoding interference information. For example, an eNB may provide an appropriate zone RNTI(s) in which a UAV's PDSCH may be scheduled, or all zone RNTIs available for data transmission to a UAV. An eNB may (e.g., also) signal an aggregation level of zone(s), for example, so that a UAV does not have to perform blind decoding.

Interference dependent aggregation levels may be provided by an eNB. Aggregation levels (e.g., during EPDCCH encoding) may be dependent on an interference level of a zone. A higher aggregation level may be used for data zones creating more interference.

An aggregation level of a zone may be adapted, for example, when an eNB may have scheduled one or more users (e.g., many users with different MCS levels) in a data zone. An aggregation level of a zone may be adapted, for example, to enable robustness in providing interference information to users of neighboring cells. An eNB may adapt a coding rate, for example, to ensure users of neighboring cells are able to decode interference information with a very high probability. An eNB may seek to ensure users in neighboring cells are not affected, for example, when the eNB allocates higher powers in some sets of PRBs/zones, which may increase interference.

The bandwidth that is available for search space may be constrained. For example, the highest aggregation levels may not be available in all data zones. There may be a fixed number of control channel elements (CCEs), which may be shared by all the aggregation levels.

Blocking may be minimized while maximizing the use of a desired aggregation level for each zone. A desired aggregation level for each zone may not be possible in some circumstances, e.g., due to a constrained bandwidth. Blocking of a desired aggregation level for a zone may be minimized. Sufficient randomization in enhanced CCEs (ECCEs) may be used for a data zone in a (e.g. each) sub-frame, for example, to minimize blocking. A search space may be dependent on, for example, a data zone, sub-frame and/or an aggregation level.

Figures 10, 11:
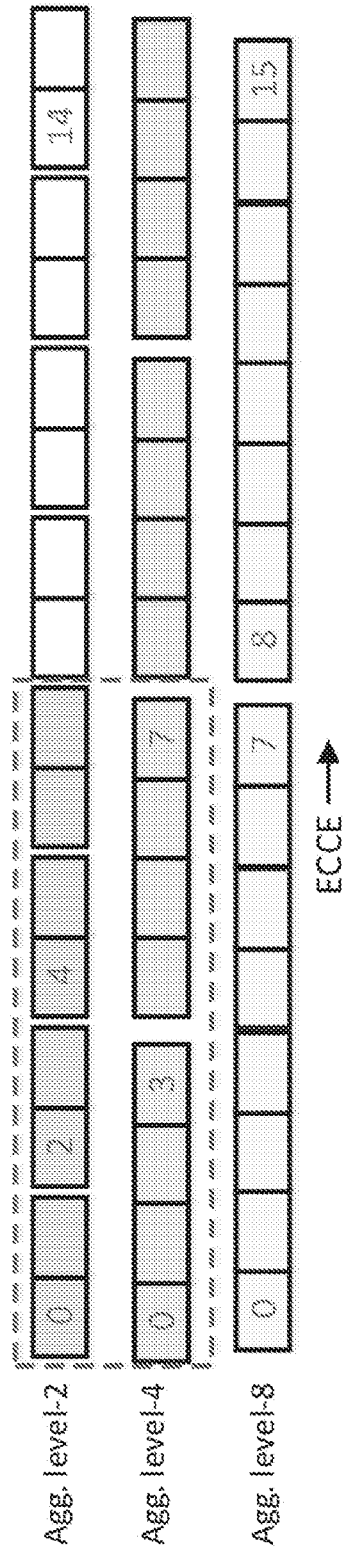
FIG. 10 is an example configuration of ECCEs shared by zones.
FIG. 11 is an example of zone based interference assistance signaling for partial interference cancellation.

FIG. 10 is an example configuration of ECCEs shared by zones. FIG. 10 shows an example of zone based aggregation levels. Table 2 shows example search candidate configurations for different aggregation levels. In an example, there may be 16 ECCEs shared by the (e.g., all the) zones and there may be three different aggregation levels.

TABLE 2

| Aggregation level | Size (in ECCE) | Number of search candidates |
| --- | --- | --- |
| 2 | 8 | 4 |
| 4 | 16 | 4 |
| 8 | 16 | 2 |

In an example (e.g., as shown by dashed line in FIG. 10 zone-1 may occupy ECCEs 0-7 at aggregation level-4. Other zones may be prevented from using aggregation level-2 and/or aggregation level-8, for example, with ECCEs 0-7 defined for level-2 and/or level-8 aggregation being allocated. Sufficient randomization dependent on aggregation level, data zone, and subframe number may be implemented by an eNB, for example, to minimize this effect, e.g., when calculated over several subframes.

In an example, a data zone specific search space at aggregation level L, and at sub-frame k may be given by Eq. (1):

$$Y_k = (A \cdot Y_{k-1}) \bmod D, \ L\{(Y_k + m') \bmod \lfloor N_{CCE,k}/L \rfloor\} + i \qquad \text{Eq. (1)}$$

where $Y_0$ may be zone RNTI, m'=0,1,2 ... of (# ePDCCH candidates−1), i=0,1,2 ... L−1, and D may be a constant.

An adjustable bandwidth search space may be provided by eNBs, for example, to use (e.g., efficiently use) EPDCCH search space resources. An aggregation level may be provided for a given zone. A total search space bandwidth may be allocated, for example, so that a maximum allowed aggregation level may be provisioned for one or more zones. ECCEs may be defined in a localized/contiguous manner such that that an eNB may use the unused ECCEs of an EPDCCH PRB pair for a PDSCH transmission. If ECCEs are defined in such a manner and a maximum aggregation level is not required for all zones, search spaces EPDCCH resources may not be wasted. This scheme may provide desired (e.g., fully utilized) aggregation levels for a zone (e.g., each zone), and may ensure that unused EPDCCH search space are utilized for PDSCH transmissions.

In an example (e.g., as shown in FIG. 7) EPDCCH may be defined in two PRB pairs. If one PRB pair is used for EPDCCH search space (e.g., EPDCCH 720, 722, and 724), the other PRB pair (e.g., EPDCCH 726, 725, and 730) may be used for PDSCH. EPDCCH search space encoding, which may include defining ECCEs, may be performed in a localized/contiguous manner (e.g., in a PRB pair-wise fashion). In an example, ECCEs that are defined for a first EPDCCH search space (e.g., EPDCCH PRB pair) may be encoded/searched. This may be followed by a next EPDCCH search space (e.g., a next EPDCCH PRB pair) and may continue, for example, until no EPDCCH search spaces remain.

An eNB may provide interference assistance signaling in EPDCCH. The interference signaling may include signaling interference data in a zone specific search space. Bandwidth limitations may constrain the amount of interference information that can be signaled. Examples may be provided herein to overcome bandwidth limitations.

Partial interference cancellation may be implemented using, for example, interference assistance signaling. In an example, (e.g., only) Modulation and Coding Scheme (MCS) information and corresponding PRB allocations may be provided (e.g., for interference assistance signaling) by an eNB. A UAV may be informed or may determine which zones/PRBs its data may be scheduled for by a serving eNB. A UAV may decode the corresponding zone interference information, which may be included in the EPDCCH of neighboring cells. The corresponding zone interference information may allow a UAV to determine an MCS that may be used for its PRBs. An estimate of interference may be obtained using zone interference information (e.g., MCS information and/or corresponding PRB allocation for neighboring cells), for example, when actual interference data is not signaled.

FIG. 11 is an example of zone based interference assistance signaling for partial interference cancellation, which may be provided by cooperating eNBs. FIG. 11 shows an example of zone based interference signaling, for example, for the data zone structure shown in FIGS. 7 and 8. Interference information signaling may indicate the PRB allocations and the corresponding MCS that may be used by an eNB in a zone.

Complete interference cancellation may be provided using, for example, a Cell Radio Network Temporary Identifier (C-RNTI). A C-RNTI may be provided in the EPDCCH of a neighboring cell for a WTRU that may be scheduled in a zone.

Figure 12:
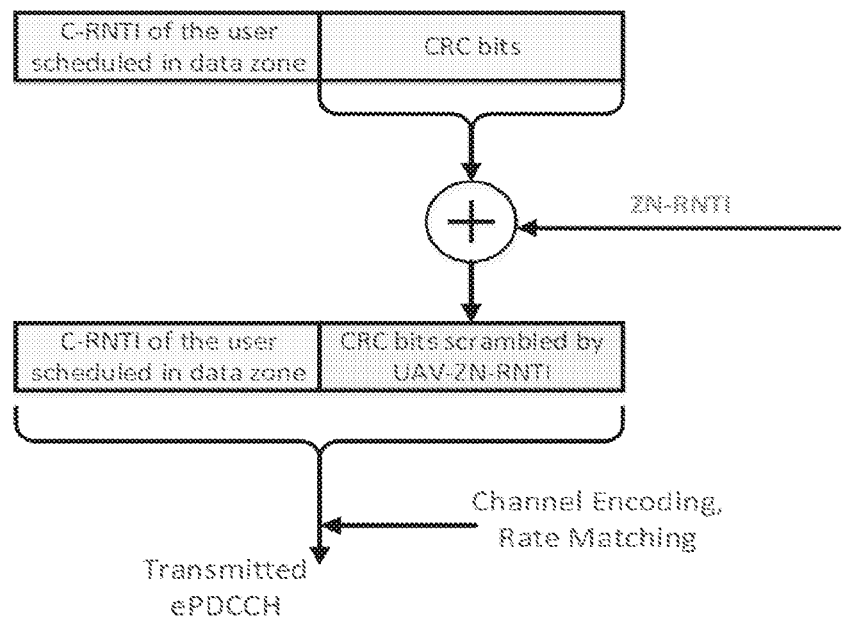
FIG. 12 is an example of EPDCCH encoding for complete interference cancellation.

FIG. 12 is an example of EPDCCH encoding for complete interference cancellation. In an example of encoding and decoding, an eNB may encode a C-RNTI of a user that may be scheduled in a data zone. The C-RNTI of the user may be attached to CRC bits (e.g., 16 bit CRC bits) and scrambled with a zone or region RNTI (e.g., ZN-RNTI). An eNB may transmit the encoded C-RNTI in an EPDCCH.

A WTRU may perform a blind decoding of the EPDCCH of a neighboring cell, for example, to decode a C-RNTI of the user in the neighboring cell that is scheduled in the data zone. The user may use the C-RNTI to obtain interference information corresponding to the data zone of interest from the neighboring cell. In some scenarios, a C-RNTI specific to the user may be used to decode the interference information in the neighbor cell. In some scenario, a ZN-RNTI may be used to decode the interference information in the neighbor cell. In some scenarios, both a C-RNTI and a ZN-RNTI may be used to decode the interference information in the neighbor cell.

A serving cell user may use an obtained C-RNTI to decode a PDCCH of a neighboring cell. MCS information etc., which may help perform partial interference cancellation, may be obtained, for example, based on the decoding of the PDCCH of a neighboring cell.

A PDSCH of a neighboring cell may be decoded, for example, to perform code word level (e.g., successive) interference cancellation (e.g., perfect interference cancellation).

Data zone specific reference signals (DS-RS) may enable UAVs connected to neighboring cells, for example, to estimate an interference channel on a per zone basis. Interference channel estimation using a cell specific reference signals (CRS) may not be performed on a per-zone basis. A channel estimation that may be obtained by a CRS (e.g., over a much wider band than a data zone(s)/region) may not reflect an interference channel per zone. A cell specific reference sequence, which may be present (e.g., irrespective of cell bandwidth), may not be present in a zone(s)/region of interest for zone based channel estimation.

Figure 13:
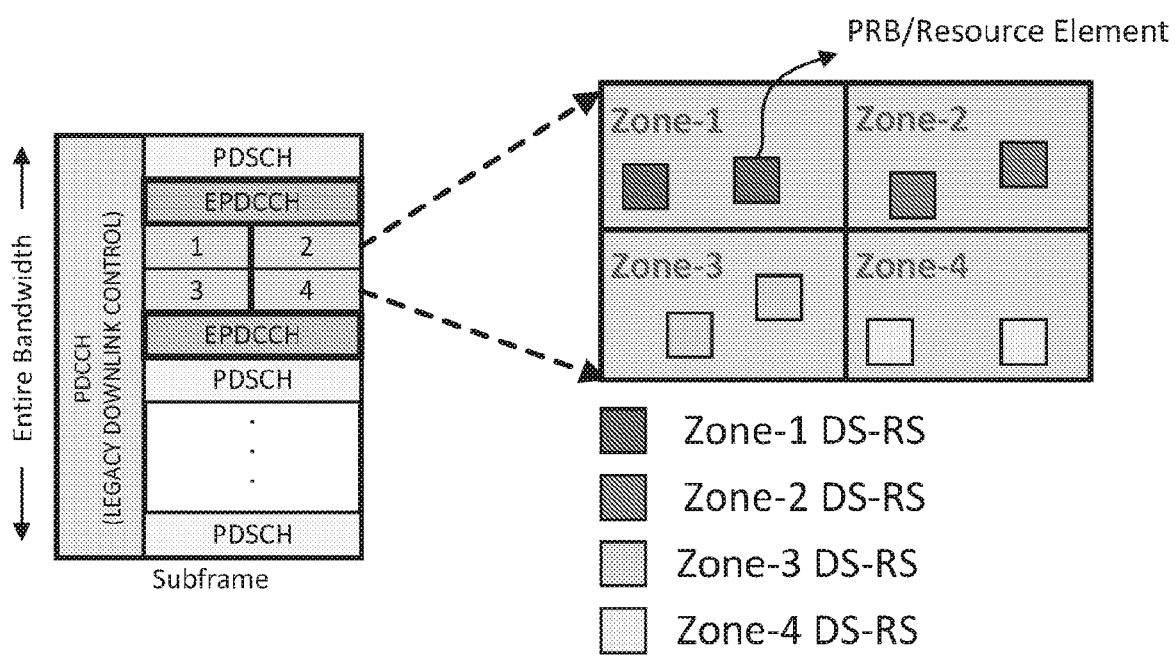
FIG. 13 is an example of a DS-RS for interference channel estimation.

FIG. 13 is an example of a DS-RS, which may be used for interference channel estimation. FIG. 13 shows an example where DS-RS may be placed on a per zone basis. In an example, cooperating eNBs may have a cooperating cell-id, which may be a part of reference signal sent by cooperating eNBs. For example, a reference sequence identifier (ID) for zone-x sent by a cooperating eNB id-y may be the tuple (y, x).

Cooperating eNB reference sequence IDs may be provided, for example, by a serving eNB to a UAV (e.g., through RRC). A UAV may report the CRS of neighboring cells to a serving eNB. Cooperating eNBs may coordinate, amongst themselves (e.g., through X2), to generate reference sequence IDs that may be suitable for interference channel estimation. A serving cell may provide a UAV with the reference sequence IDs for interference channel estimation.

Cooperating eNBs may determine (e.g., agree on) a frequency shift (e.g., using the X2 interface) where DS-RS may be present. A serving eNB may indicate the frequency shift to a UAV.

Zone specific sequences used by eNBs may be orthogonal. The NBs may use the same resource blocks to transmit an orthogonal reference signal on a per zone basis. In an example, cooperating eNBs may use the same resource blocks (e.g., as shown in zones in FIG. 13) to transmit orthogonal sequences, for example, so a UAV may concurrently measure an interference channel from cooperating eNBs (e.g., all cooperating eNBs). An orthogonal sequence that may be used by cooperating eNBs may be signaled by a serving eNB to a UAV, for example, to permit the UAV to estimate interference channel to an appropriate eNB.

A connection to a channel state information reference signal (CSI-RS) may be provided. A DS-RS may be transmitted specific to zone(s). A CSI-RS may be transmitted in multiple (e.g., all) resource blocks in a selected sub-frame (e.g., covering entire cell bandwidth). A DS-RS may re-use a CSI-RS structure for a reference signal and its placements, for example, as shown in FIG. 14.

Figure 14:
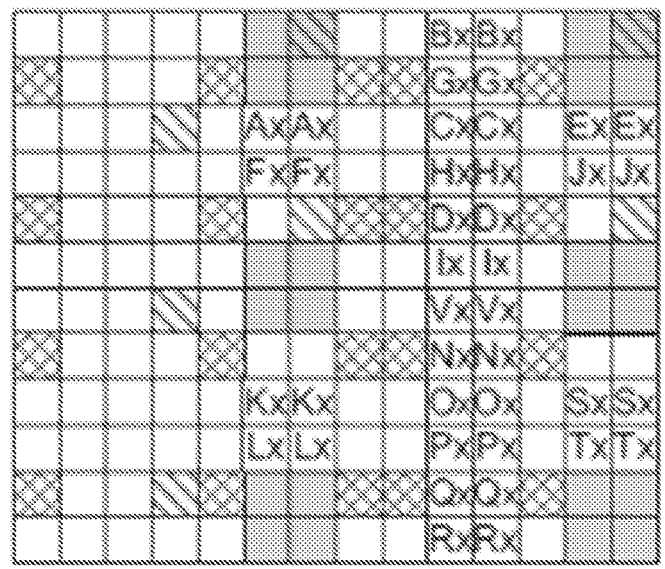
FIG. 14 is an example of DS-RS placements for interference channel estimation.

FIG. 14 is an example of DS-RS placements for interference channel estimation. As seen in FIG. 14. DS-RS placements are marked with letters while DM-RS/CRS placements are marked by shaded and hashed regions. In an example, DS-RS may be placed anywhere in a region marked with letters Ax, . . . , Tx). In an example, a cell may place a DS-RS for zone-1 a region marked "Ax," place a DS-RS for zone-2 in the region marked "Qx" and so on.

A DS-RS may be transmitted (e.g., only) in sub-frames unused by a CSI-RS. ADS-RS may (e.g., similar to CSI-RS) have one or more of the following attributes: periodicity and/or a sub-frame offset.

In an example, a CSI-RS/sub-frame offset may be configured, for example, so that channel parameters may be measured less often (e.g., higher sub-frame offset/periodicity), e.g., for older and newer release WTRUs. Newer release WTRUs (e.g., UAV category WTRUs) may be configured with a DS-RS having lower sub-frame offsets/periodicity than a CSI-RS. A DS-RS scheme may enable an interference channel to be measured more often without transmitting over an entire bandwidth, which may improve spectral efficiency, e.g., relative to a CSI-RS.

One or more (e.g., all) eNBs may place a DS-RS reference signal (e.g. only) in zones where data may be scheduled. A DS-RS need not be placed on all zones on all sub-frames. Zones in which a DS-RS may be placed may be signaled through RRC, for example.

Interference management may be provided on a superzone basis. Foregoing examples may be similarly applied to regions (e.g., superzones). Foregoing examples may be read, for example, by substituting a region or multiple (e.g., many) zones (e.g., a superzone) for a zone. Encoding for a superzone may be simpler than for a zone, but may provide less granularity.

Figure 15:
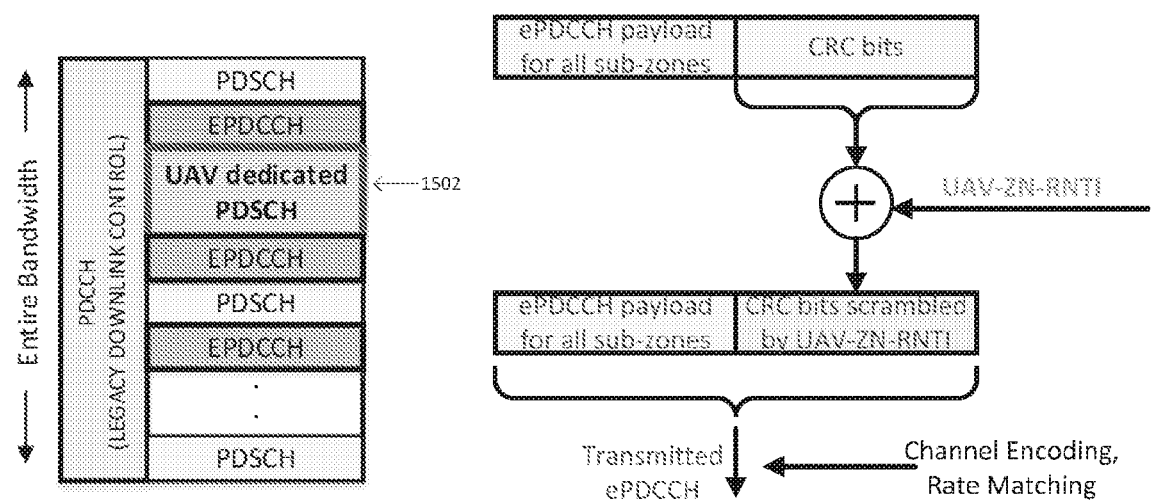
FIG. 15 is an example of superzone interference management.

FIG. 15 is an example of superzone (e.g., region) interference management. In an example, there may be one RNTI for an entire UAV dedicated PDSCH (e.g., as shown by 1502 in FIG. 15). Several aggregation levels may be used (e.g. similar to previous examples) for the UAV dedicated PDSCH. A UAV may perform blind decoding for allowable aggregation levels using a (e.g. only one) zone and/or region RNTI (e.g., ZN-RNTI).

The reliability of PDCCH may be enhanced, for example, by using an EPDCCH. EPDCCH may be frequency division multiplexed across cells. If EPDCCH is frequency division multiplexed across cells, EPDCCH interference may not exist between serving and neighboring cells. EPDCCH may have a higher probability of reliable decoding (e.g., decoding by the WTRUs being served by neighboring cells/eNBs). A PDCCH may face interference with neighboring cells, for example, when serving and neighboring cell PDCCHs may not be orthogonal. There may (e.g., also) be significant interference from neighboring cells, for example, due to line of sight channels.

Figure 16:
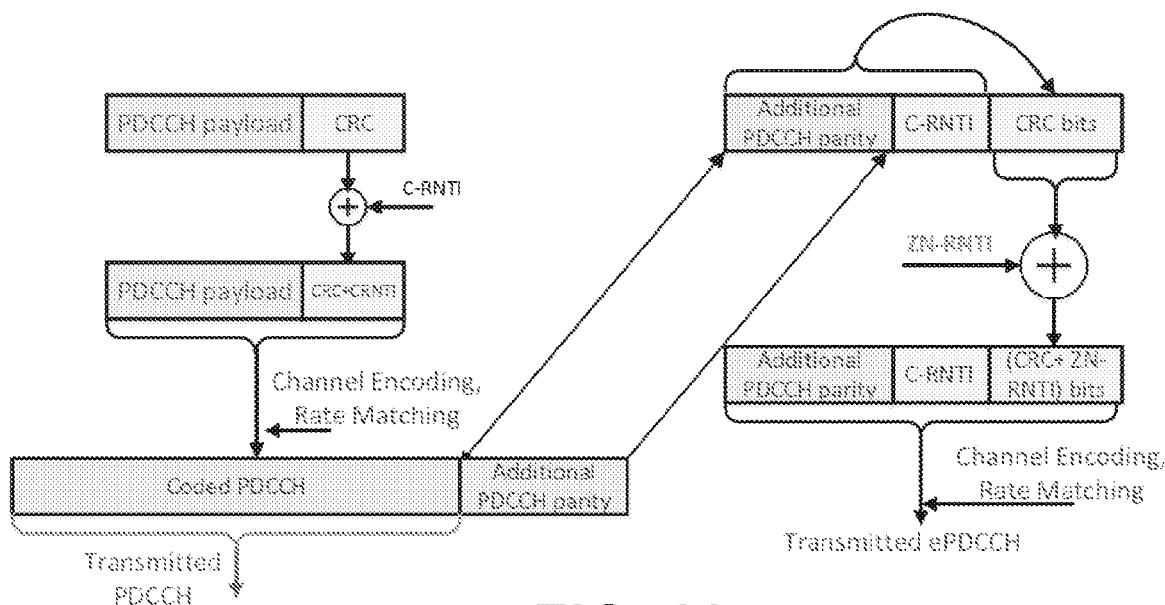
FIG. 16 is an example of data zone aware Physical Downlink Control Channel (PDCCH)/EPDCCH decoding.

Additional information useful for decoding PDCCH may be placed in an EPDCCH, for example, when a UAV may be aware of its data zone through side information (e.g., service based). A UAV may decode an EPDCCH, for example, using an appropriate zone RNTI, which may be data zone aware. An example is shown in FIG. 16. FIG. 16 is an example of data zone aware PDCCH/EPDCCH decoding. Joint encoding of PDCCH/EPDCC may be implemented, for example, so that PDCCH may be decoded by itself. Additional parity bits of PDCCH (e.g., turbo coded bits) may be provided in EPDCCH, for example, along with a C-RNTI for a user. A CRC of an EPDCCH may be scrambled by a zone RNTI, channel encoded, rate matched and transmitted in EPDCCH.

A user (e.g., a serving cell user) may use a ZN-RNTI (e.g., as the user may be data zone aware) to decode a serving cell EPDCCH (e.g., its own cell EPDCCH). A user may obtain additional parity bits of a PDCCH, e.g., as a payload available in EPDCCH. A user may use the additional parity bits, for example, to decode the PDCCH (e.g., when PDCCH decoding has failed).

A user (e.g., a neighboring cell user) may decode an EPDCCH of a neighboring cell, for example, using a ZN-RNTI, to obtain a C-RNTI and additional parity bits of its neighboring cell PDCCH. A user may be zone aware. A ZN-RNTI may be common to all cooperating eNBs, which may allow for users of cooperating cells to decode the EPDCCH of other cooperating cells. A user may use the additional parity bits and the C-RNTI of the neighboring cell user, for example, to decode the neighboring cell PDCCH. A serving cell user may (e.g., by decoding the PDCCH of the neighboring cell) infer MCS information to perform partial interference cancellation. A serving cell user may (e.g., alternatively) also decode a PDCCH of a neighboring cell, for example, to perform perfect code word interference cancellation.

Interference management may be provided during semi-persistent scheduling (SPS) transmissions. Resource indication details may be provided (e.g., by an eNB) in a PDCCH (e.g., only) at the beginning of an SPS transmission. A PDCCH, which may be related to dynamically scheduled transmissions, may be used to change the resource assignments for an existing SPS transmission or for one or more retransmissions. A UAV may monitor the PDCCH during SPS transmission.

Figure 17:
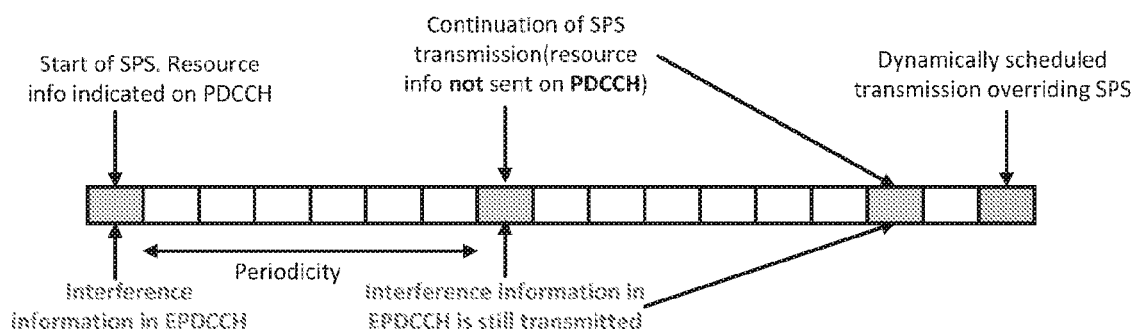
FIG. 17 is an example of interference management during semi-persistent scheduling (SPS).

FIG. 17 is an example of interference management during SPS. As seen in FIG. 17, when a SPS is scheduled (e.g., first scheduled), the corresponding resource information may be provided in PDCCH. Resource information may not be provided in PDCCH for subsequent SPS transmissions. Interference information may be provided to users in neighboring cells (e.g. in this situation).

As seen in FIG. 17, when a neighboring cell continues an SPS transmission (e.g., when PDCCH signaling on the resource information is not performed), the interference information for a zone (e.g., for all zones) may be transmitted (e.g., may still be transmitted) in the subframe.

An eNB may (e.g., when performing an SPS transmission) provide (e.g., via an X2 interface), for example, an MCS, resource assignment information for one or more (e.g., all) zones, and an SPS period to cooperating eNBs/neighboring cells. A serving cell may (e.g., may in turn) signal interference information of zones obtained from (e.g., all) neighboring cells (e.g., through RAC/media access control (MAC) control element (CE) signaling) to UAVs. The serving cell may signal (e.g., may also, additionally, or alternatively signal) subframe number(s)/periodicity, for which signaled interference information may be valid.

Uplink interference management may be provided by eNBs/cells. For example, a dedicated data region/zone may be extended to uplink transmissions. An eNB may determine MCS and PRB allocations for its users in an uplink. An eNB may (e.g., also) transmit uplink interference information to neighboring cells.

An eNB may signal, to cooperating eNBs (e.g., via X2), MCS and PRB allocation information for (e.g., every) zone(s)/region interference information for all zones), for example, similar to examples discussed with respect to FIG. 11.

An (e.g., each) eNB may decode a PDCCH of a neighboring cell, e.g., to obtain uplink interference information. A C-RNTI of users may be signaled among cooperating eNBs through X2). eNBs may, for example, support full-duplex transmission, e.g., to transmit their own PDCCH in addition to decoding a neighboring cell's PDCCHs.

A downlink control information (DCI) format may be provided for UAVs. MCS and PRB assignments may be provided in an EPDCCH, for example, to signal interference information to neighboring cells. This information may (e.g., may also) be in a PDCCH that may be signaled by a eNB to a UAV/WTRU. A UAV that may be connected to a serving cell may obtain it, for example, from a PDCCH or a EPDCCH. MCS and PRB allocations may be provided in PDCCH on a per-user basis by an eNB/cell. MCS and PRB allocations may be provided (e.g., instead provided) on a per-zone basis.

MCS information may be transmitted (e.g., only) in an EPDCCH, for example, for UAV category WTRUs. A DCI for format-1 may, for example, have one or more of the following: a resource allocation header, resource block assignment for resource allocation (RA) type 0, subset, shift, resource block assignment for block type-1, Hybrid Automatic Repeat Request (HARQ) process, redundancy version (RV) and/or Transmit Power Control (TPC) for PUCCH. In an example, a DCI may not include MCS information in a PDCCH, because this information may be available (e.g., may already be available) in EPDCCH.

A UAV type WTRU may obtain PRB allocations from PDCCH and may decode an appropriate zone in an EPDCCH, for example, to obtain MCS information, for example, according to a signaling example described with respect to FIG. 11.

Systems, methods, and instrumentalities have been disclosed for active interference management. Active interference management may be provided for designated data regions and/or superzones. UAV-specific or other designated data regions e.g., with data zones) may enable dynamic inter-cell interference management and high reliability command & control for UAVs interference prone environments. Data zone/region specific control channel search space may support inter-cell interference cancellation. Aggregation levels (e.g., during EPDCCH encoding) may be dependent on an interference level of a zone. Data zone specific reference signals (DS-RS) may enable UAVs connected to neighboring cells to estimate an interference channel per zone. Interference management may be provided during semi-persistent scheduling (SPS) transmissions. Reliability of Physical Downlink Control Channel (PDCCH) may be enhanced (EPDCCH), e.g., with interference assistance signaling. Uplink interference management may operate with dedicated data region/zones. A downlink control information (DCI) format may be provided for UAVs where the MCS, PRB allocations are signaled in EPCCH. Other parameters (the rest of the parameters like TPC, HARQ process, RV, etc.) may be signaled in PDCCH.

Features, elements and actions (e.g., processes and instrumentalities) are described by way of non-limiting examples. While examples may be directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Figure 18:
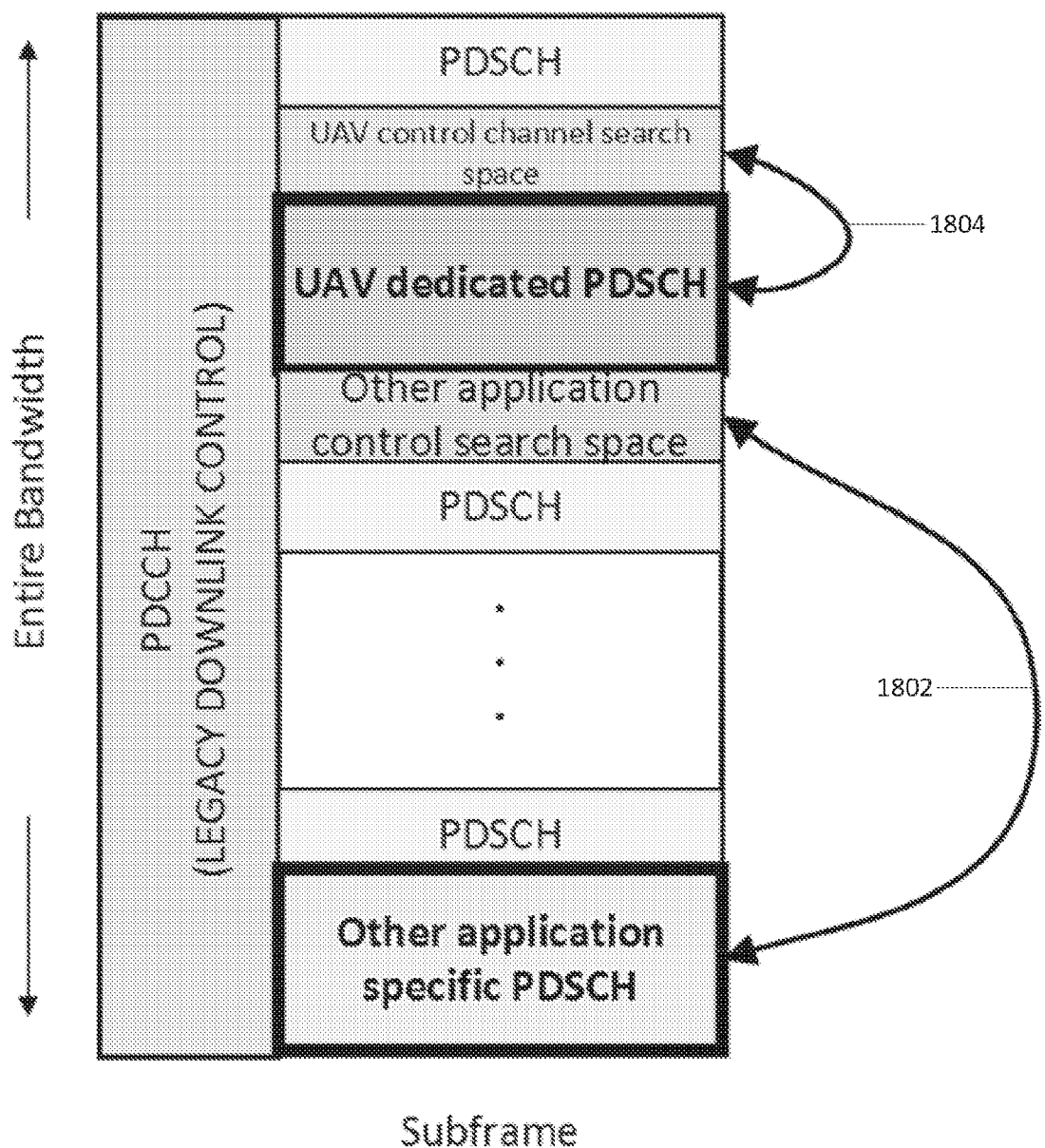
FIG. 18 illustrates an example of a contiguous UAV control channel search space.
Figure 19:
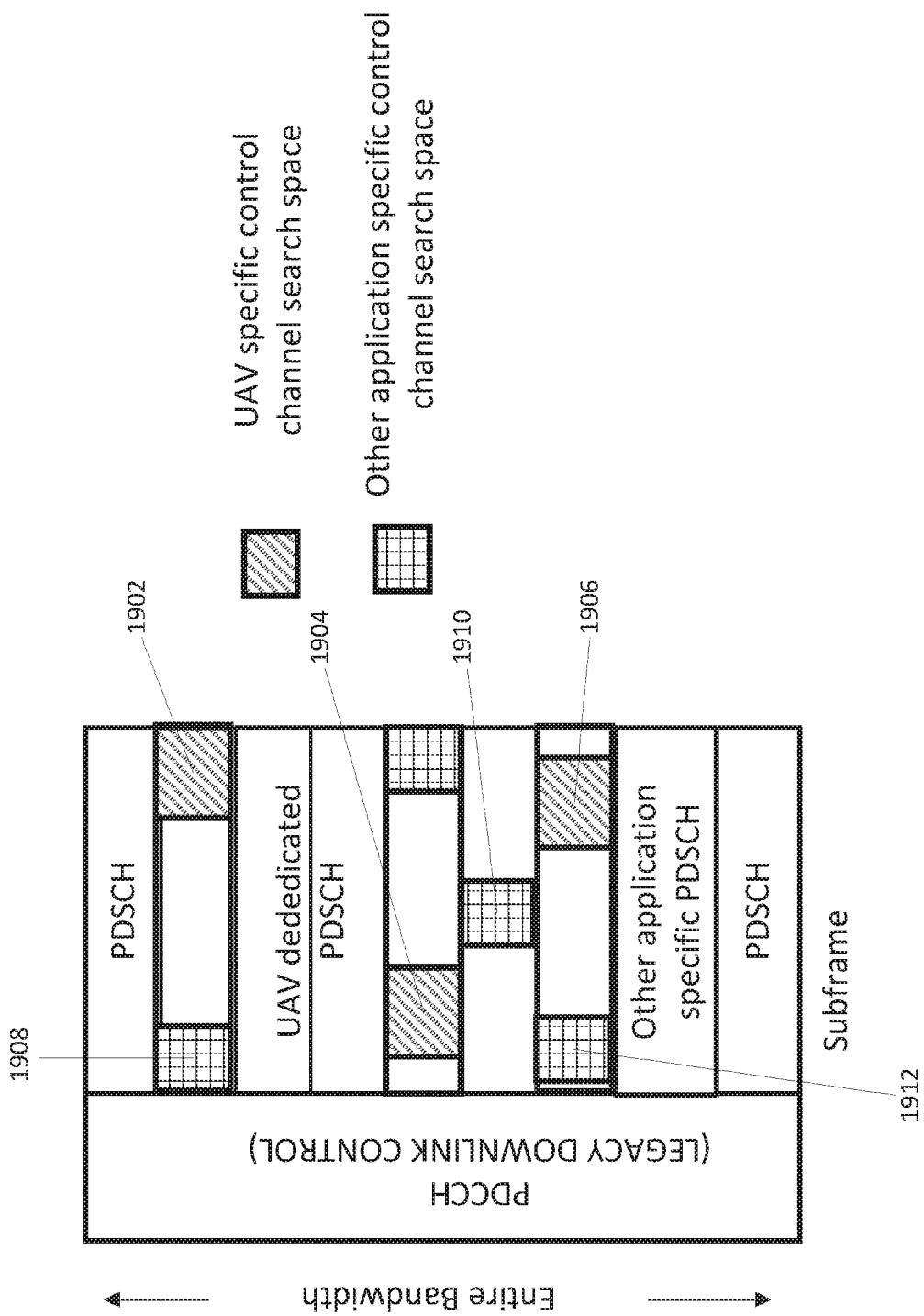
FIG. 19 illustrates an example of a non-contiguous UAV control channel search space.

Data region specific control channel search space(s) may be defined per cell. For example, FIG. 18 illustrates an example where multiple (e.g., two) data regions are defined in PDSCH: a UAV dedicated PDSCH region and other application specific PDSCH region. The corresponding control channel specific search spaces for each PDSCH region, 1802 and 1804, are shown in a contiguous fashion in FIG. 18. FIG. 19 illustrates an example of data specific control channel search space(s) that are defined in a distributed manner. As seen in FIG. 19, UAV specific control channel search spaces 1902, 1904, and 1906 and other application control channel search spaces 1908, 1910, and 1912 are distributed. Depending on the application, the WTRU may perform a control channel search in the appropriate search space without having to perform a search in other search spaces. For example, UAV may use the control search space defined for UAVs and may determine not to use other search space regions, thereby reducing complexity in performing search space operations. It should be noted the data specific control channel search space definition is not limited only to EPDCCH/PDCCH and may be applicable to other types of control channels.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method, comprising:
   receiving a physical downlink control channel (PDCCH) transmission, wherein the PDCCH transmission is received via a serving cell;
   decoding downlink control information (DCI) comprised in the PDCCH transmission;
   determining an unmanned aerial vehicles (UAV) designated data region associated with a downlink transmission in the serving cell, wherein the determination is based on the decoded DCI;
   receiving one or more enhanced physical downlink control channel (EPDCCH) transmissions via one or more neighbor cells;
   decoding the one or more EPDCCH transmissions, wherein the one or more decoded EPDCCH transmissions comprise interference information associated with the UAV designated data region; and decoding the downlink transmission associated with the UAV designated data region using the interference information comprised in the one or more decoded EPDCCH transmissions.

2. The method of claim 1, further comprising determining a search space based on the UAV designated data region indicated in the decoded DCI, and the search space is used to identify the one or more EPDCCH transmissions to decode.

3. The method of claim 1, wherein the one or more EPDCCH transmissions are decoded using a zone specific radio network temporary identifier (ZN-RNTI), wherein the ZN-RNTI is determined based on the UAV designated data region indicated by the decoded DCI.

4. The method as in claim 3, wherein the ZN-RNTI is determined based further on a data region specific search space for the UAV designated data region indicated by the decoded DCI.

5. The method of claim 1, wherein the PDCCH transmission and the one or more EPDCCH transmissions are decoded using blind decoding.

6. The method of claim 1, wherein the PDCCH transmission, the one or more EPDCCH transmissions, and the downlink transmission are received by a UAV comprising a wireless transmit/receive unit (WTRU).

7. The method of claim 1, wherein the one or more EPDCCH transmissions use frequency division multiplexed across different cells.

8. The method of claim 1, wherein the interference information comprises information regarding one or more transmissions from the one or more neighbor cells, wherein the one or more transmissions are sent using resources of the UAV designated data region.

9. The method of claim 1, wherein the UAV designated data region comprises a UAV-specific data zone.

10. The method of claim 1, wherein the UAV designated data region comprises one or more zones.

11. A wireless transmit/receive unit (WTRU), comprising:
a processor configured to:
receive a physical downlink control channel (PDCCH) transmission, wherein the PDCCH transmission is received via a serving cell;
decode downlink control information (DCI) comprised in the PDCCH transmission;
determine an unmanned aerial vehicles (UAV) designated data region associated with a downlink transmission in the serving cell, wherein the determination is based on the decoded DCI;
receive one or more enhanced physical downlink control channel (EPDCCH) transmissions via one or more neighbor cells;
decode the one or more EPDCCH transmissions, wherein the one or more decoded EPDCCH transmissions comprise interference information associated with the UAV designated data region; and
decode the downlink transmission associated with the UAV designated data region using the interference information comprised in the one or more decoded EPDCCH transmissions.

12. The WTRU of claim 11, wherein the processor is further configured to determine a search space based on the UAV designated data region indicated in the decoded DCI, and the search space is used to identify the one or more EPDCCH transmissions to decode.

13. The WTRU of claim 11, wherein the one or more EPDCCH transmissions are decoded using a zone specific radio network temporary identifier (ZN-RNTI), wherein the ZN-RNTI is determined based on the UAV designated data region indicated by the decoded DCI.

14. The WTRU of claim 13, wherein the ZN-RNTI is determined based further on a data region specific search space for the UAV designated data region indicated by the decoded DCI.

15. The WTRU of claim 11, wherein the PDCCH transmission and the one or more EPDCCH transmissions are decoded using blind decoding.

16. The WTRU of claim 11, wherein the PDCCH transmission, the one or more EPDCCH transmissions, and the downlink transmission are received by a UAV comprising the WTRU.

17. The WTRU of claim 11, the one or more EPDCCH transmissions use frequency division multiplexed across different cells.

18. The WTRU of claim 11, wherein the interference information comprises information regarding one or more transmissions from the one or more neighbor cells, wherein the one or more transmissions are sent using resources of the determined UAV designated data region.

19. The WTRU of claim 11, wherein the UAV designated data region comprises a UAV-specific data zone.

20. The WTRU of claim 11, wherein the UAV designated data region comprises one or more zones.

* * * * *